Nov. 1, 1966  A. R. CHASAR  3,282,383

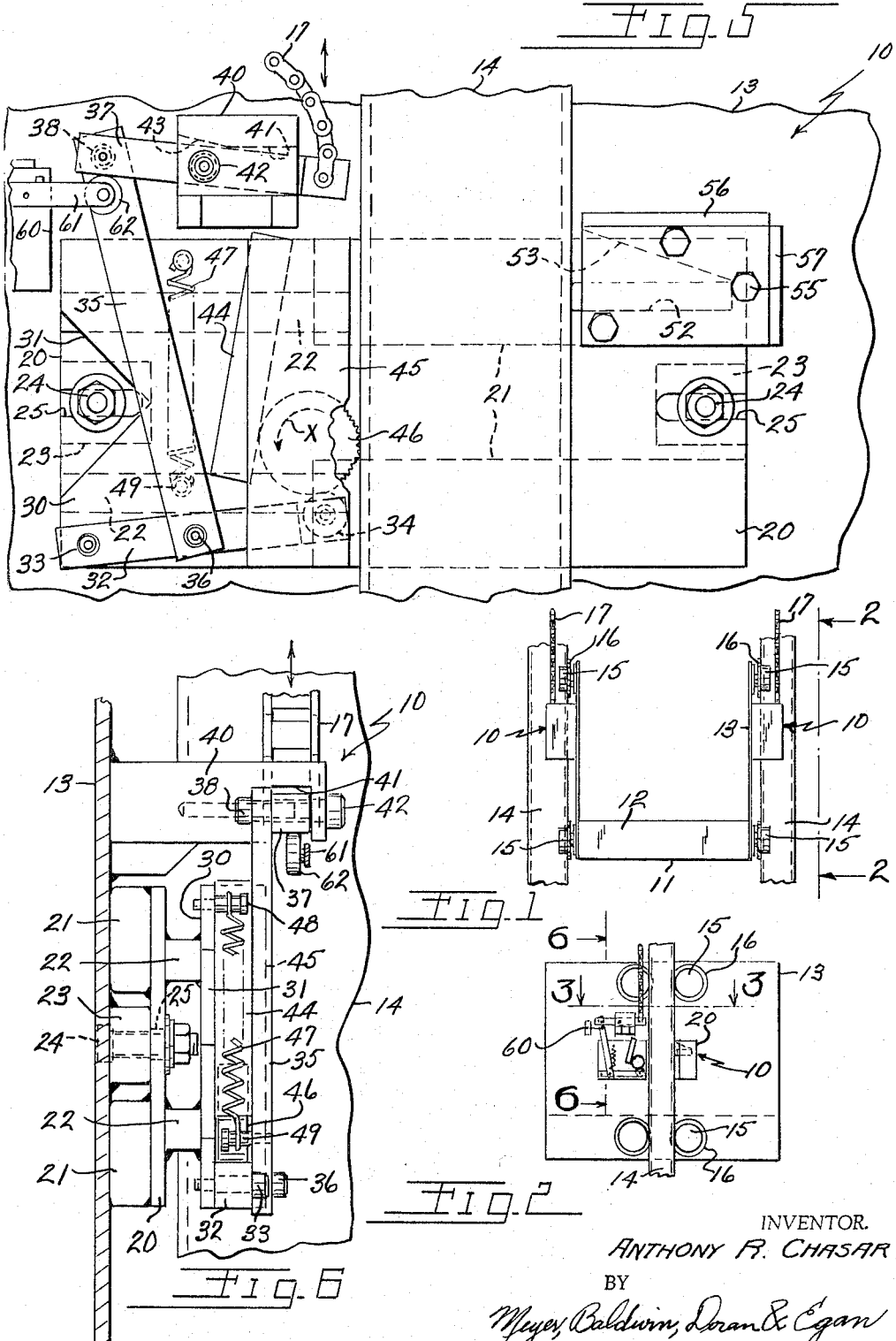

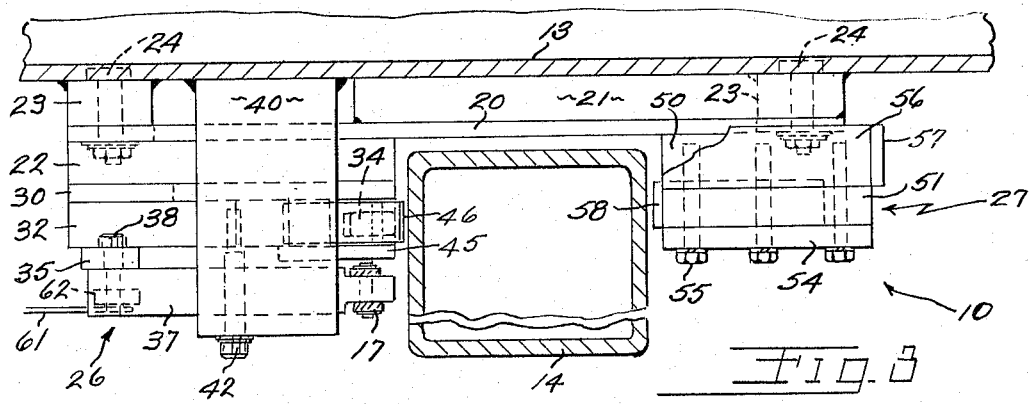
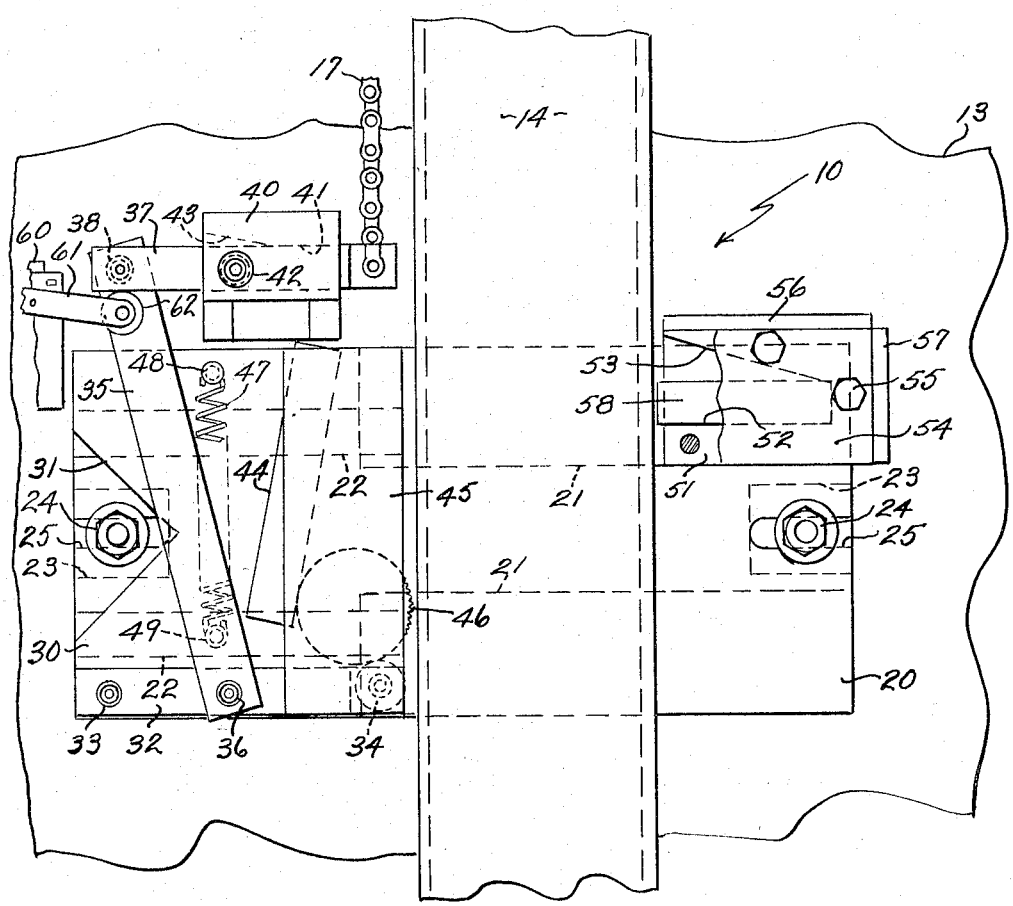

FREE-FALL SAFETY BRAKE

Filed June 30, 1964   3 Sheets-Sheet 3

INVENTOR.
ANTHONY R. CHASAR
BY
Meyer, Baldwin, Doran & Egan
ATTORNEYS

United States Patent Office 3,282,383
Patented Nov. 1, 1966

3,282,383
FREE-FALL SAFETY BRAKE
Anthony R. Chasar, Mentor, Ohio, assignor to The Triax Company, Cleveland, Ohio, a corporation of Ohio
Filed June 30, 1964, Ser. No. 379,122
8 Claims. (Cl. 187—88)

This invention relates to brake mechanisms for elevators and particularly to a safety brake which is so connected with the hoisting mechanism of the elevator that said brake is automatically and positively engaged whenever said hoisting mechanism fails. This feature of automatic and positive engagement upon hoisting failure constitutes the broad, primary objective of the present invention.

A more specific object of the invention is to provide a safety brake which is normally biased to braking position and is held in the released position by the weight of the elevator.

Still another object is to provide a safety brake of the type referred to having linkage for holding said brake in the released position with the elevator hoisting means being connected to said linkage whereby the weight of the elevator holds said brake in the released position.

Yet another object is to provide a safety brake having the above features wherein the hoisting means includes a flexible connection means which is connected to said linkage whereby when said flexible connection means becomes slack, said linkage automatically moves to a brake actuated position.

A further object is to provide a safety brake as set forth above for braking against a fixed vertical column wherein said brake has a laterally displaceable base means carrying wedge means on either side of said column upon actuation of said brake.

A still further object is to provide such a safety brake wherein one of said wedge means comprises a wheel carried by the base means which said wheel is biased upwardly and cammed inwardly toward the column upon actuation of the brake whereby the falling movement of a disabled elevator increases the wedging action of said wheel, laterally displaces said base means, and brings the second wedge means into engagement with the opposite side of said column.

Another object is to provide such a safety brake having in conjunction therewith a control element which is actuatably responsive to movement of the linkage to cut off power to the elevator structure when the brake is engaged.

Yet another object is to provide an elevator structure and free-fall safety brake means therefor including a fixed column against which said brake reacts.

Further objects of the invention will be readily understood from the following description of one embodiment of the invention as illustrated in the accompanying drawings, in which:

FIG. 1 is an end view of a simple elevator structure with the safety brake of this invention carried at the sides thereof;

FIG. 2 is a side view of the elevator structure of FIG. 1 as seen from the line 2—2 of FIG. 1;

FIG. 3 is an enlarged section taken along the line 3—3 of FIG. 2;

FIG. 4 is an enlarged side view of the safety brake as illustrated in FIG. 2, said brake being in the released position;

FIG. 5 is a view similar to FIG. 4 showing the safety brake actuated but just prior to being in the braked position;

FIG. 6 is an end view of the brake as seen from the line 6—6 of FIG. 2; and

Figure 7:
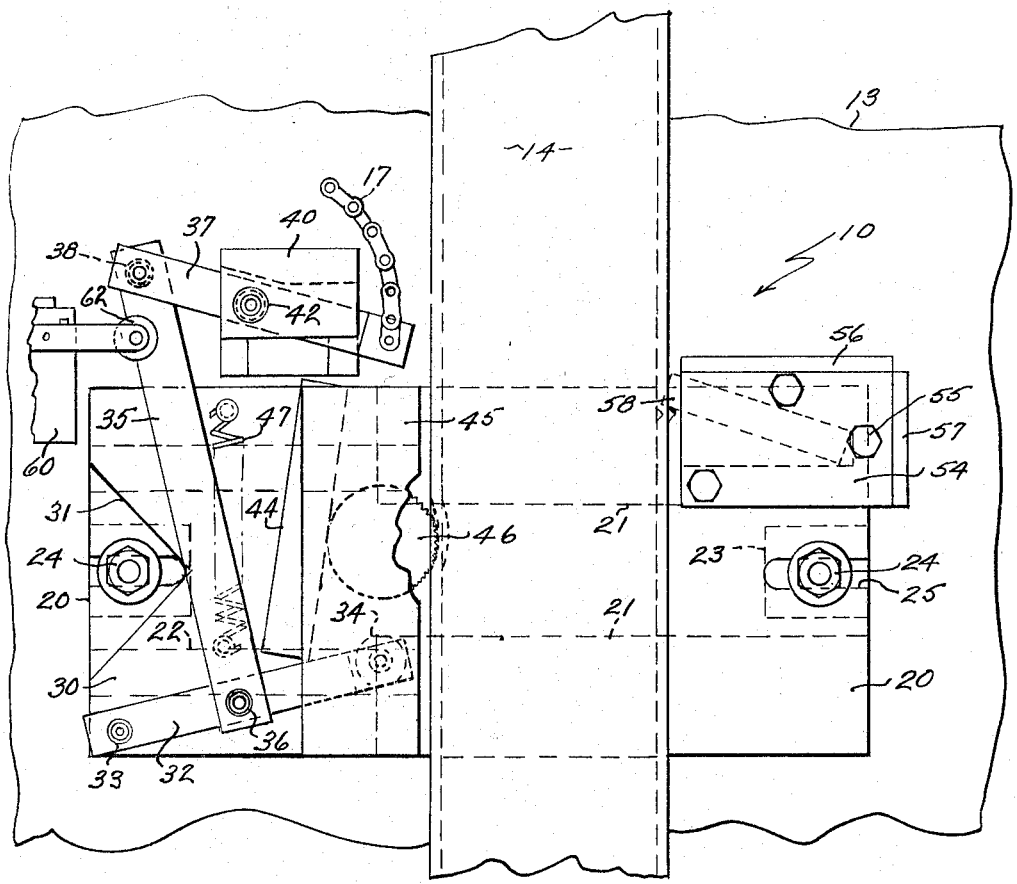
FIG. 7 is a view similar to FIGS. 4 and 5 showing the brake in the fully braked position.

Referring now to the drawings, and particularly to FIGS. 1 and 2, the safety brake of this invention is indicated generally at 10, two of said safety brakes being shown carried by a simple elevator structure 11. Said elevator structure comprises a horizontal base 12 having upstanding side walls 13 at either side of said base. The elevator structure 11 is disposed between a pair of columns 14 which, as herein illustrated, are rectangular in form.

The elevator structure 11 engages the columns 14 for movement vertically therealong by flanged wheels 15 carried by the side walls 13. As seen from the side in FIG. 2, the elevator structure 11 is symmetrically disposed with respect to the columns 14, and the flanged wheels 15 are disposed in upper and lower pairs on the side walls 13 in such manner as to maintain the upright position of said elevator structure as it moves vertically along the columns. The wheels 15 are each provided with a single flange 16 which said flange overlaps the inner surface of the adjacent column to generally maintain the elevator structure against sidewise displacement.

A safety brake 10 of this invention is carried on the outer surface of each side wall 13, and a hoisting chain 17 is connected to each said safety brake for raising and lowering the elevator structure 11. In the illustration in FIG. 1, the elevator structure 11 carries two of the safety brakes 10 which said safety brakes are identical in construction although they are preferably mirror images of each other. Therefore, only the safety brake which would be seen from the line 2—2 of FIG. 1 is herein illustrated in detail. It will be understood that the safety brake of this invention may be applied to an elevator singly instead of in pairs since each brake functions independently of the other and is, itself, capable of adequately braking the elevator.

Referring now to FIGS. 3-7 of the drawings, the safety brake of this invention is made of a suitable structural material such as steel and comprises a base plate 20 of rectangular shape having a longer dimension disposed in a horizontal direction and being located adjacent the outer surface of the adjacent side wall 13 between said side wall and the adjacent column 14. A pair of elongated spacer blocks 21 are welded to the base plate 20 adjacent to the upper and lower edges thereof, said spacer blocks being interposed between said base plate and the side wall 13 and slidable against the outer surface of said side wall. It will be noted that the spacer blocks 21 extend from the right-hand edge of the base plate 20, as seen in FIG. 3, substantially more than half the horizontal length of said base plate and that the outer surface of said base plate carries a second pair of spacer blocks designated 22 (FIG. 6) which extend from the left-hand edge of the base plate toward the right in overlapping relation to the spacer blocks 21. The second pair of spacer blocks 22 is also welded to the base plate 20, and together said spacer blocks 21 and 22 stiffen and reinforce said base plate.

The spacer blocks 21 are spaced from each other in a vertical direction and are disposed above and below a pair of end mounting blocks 23 which are welded to the side wall 13. The mounting blocks 23 have the same thickness as the spacer blocks 21, and it will be understood that whereas the spacer blocks 21 slidably engage the outer surface of the side wall 13, the outer surfaces of said end mounting blocks slidably engage the inner surface of the base plate 20. Shoulder screws 24 project outwardly through the side wall 13 and the mounting blocks 23 through suitable, elongated slots 25 in the base plate (FIG. 5) whereby said base plate is secured to said side wall. The shoulder screws 24 prevent the base plate 20 from being tightened against the mounting blocks 23 sufficiently to prevent horizontal, endwise movement of said base plate which said endwise movement is afforded by the slots 25. Normally, the base plate 20 is secured whereby there is sufficient friction between the mounting blocks 23 and the base plate 20, and the spacer blocks 21 and the side wall 13, to hold the safety brake in the inoperative position but not with sufficient friction to prevent endwise movement of said base plate in operation of the brake in a manner to be hereinlater fully described.

It will be noted that, as seen in elevation, the base plate 20 extends horizontally a substantial distance beyond either side of the adjacent column 14. As seen in FIGS. 4 and 5, said base plate carries a brake wheel mechanism generally shown at 26 on its left-hand portion and a brake wedge assembly generally indicated at 27 on its right-hand portion.

The brake wheel assembly 26 is carried by a secondary base plate 30 which, in turn, is welded to the second pair of spacer blocks 22 and which is provided with a V-shaped, access notch 31 affording access to the adjacent shoulder screw 24. The secondary base plate 30 carries a brake finger 32 which is pivoted upon a shoulder screw 33 to the outer surface of said secondary base plate at the lower corner thereof furthest from the column 14. Said brake finger projects parallel with said secondary base plate in the direction of the column 14, the distal end of said brake finger being bifurcated or otherwise suitably formed to carry a small roller 34 which projects upwardly slightly above the upper edge of said brake finger (FIGS. 4 and 5). A brake link 35 is pivoted by a shoulder screw 36 at one end thereof to the brake finger 32 intermediate the shoulder screw 33 and the roller 34. Said brake link projects obliquely upwardly and divergently outwardly from the column 14 with the upper end of said brake link being disposed above the upper edge of the secondary base plate 30. A generally horizontally disposed brake lever 37 is pivoted at one of its ends to the upper end of the brake link 35 by a shoulder screw 38. Said brake lever projects in the direction of the column 14 with the end thereof which is disposed adjacent to said column connected to a hoisting chain 17.

The brake lever 37 projects through a slotted lift lug 40 which is welded to the side wall 13. Said lift lug is connected to said side wall above the base plates 20 and 30 and projects outwardly therebeyond. The distal end portion of said lift lug has a downwardly open slot 41 through which the brake lever 37 projects. Said brake lever is pivoted within the slot 41 by a shoulder screw 42 which is disposed adjacent to the left-hand end of the slot 41 (FIGS. 4 and 5). Said slot 41 is tapered upwardly as shown at 43 just above the shoulder screw 42 with the portion of the brake lever 37 which is disposed between said shoulder screw 42 and the hoisting chain 17 being disposed flatwise against the top of the slot 41.

Between the brake link 35 and the column 14, the secondary base plate 30 carries an oblique cam member 44 which converges upwardly in the direction of said column. Said cam member is welded or otherwise suitably secured to the secondary base plate and carries at its outer surface a retainer plate 45. The cam member 44 serves as a spacer means for spacing the retainer plate 45 outwardly away from the secondary base plate 30 thereby affording an upwardly convergent pocket above the distal end portion of the brake finger 32, said pocket containing a freely movable, knurled brake wheel 46. As shown in FIG. 4, the brake wheel 46 normally rests upon the brake finger roller 34 and back against the lower end portion of the cam member 44, there being provided a slight clearance between said brake wheel and the column 14. As well shown in FIGS. 3 and 6, the second pair of spacer blocks 22 space the actuating mechanism of the brake wheel assembly outwardly whereby the knurled brake wheel 46 can contact one side surface portion of the column 14.

The safety brake 10 is normally biased to the engaging or actuated position as illustrated in FIG. 5 by a coil spring 47 which is generally vertically disposed and which is connected at its upper end to a shoulder screw 48 carried by the secondary base plate 30 and at its lower end to a shoulder screw 49 carried generally adjacent to the lower end portion of the brake link 35. The coil spring 47 resiliently urges the brake lever 37 and the brake finger 32 upwardly whereby the roller 34 tends to push the brake wheel 46 upwardly within its pocket. Upward movement of the brake wheel causes it to move inwardly toward the column because of the upwardly and inwardly tilted cam member 44 which cams said brake wheel toward said column. However, in normal operation with the elevator structure being supported by the hoisting chain 17, the horizontal brake lever 37 holds the brake finger 32 in a horizontal position through the brake link 35 whereby the brake wheel 46 remains inoperative in the bottom of its pocket as illustrated in FIG. 4.

The brake wedge assembly 27 which is disposed on the opposite side of the column 14 comprises a spacer block 50 welded at the upper right-hand corner of the outer surface of the base plate 20, said spacer block, as herein illustrated, projecting slightly above and to the right of said base plate (FIGS. 4, 5 and 7). A brake wedge holder 51 in the form of a block of substantially the same shape and size as the spacer block 50 is disposed flatwise against the outer surface of said spacer block. Said wedge holder is cut out to form a pocket which opens toward the column 14, said pocket having a horizontal bottom surface 52 and an angled upper surface 53 which said upper surface diverges outwardly toward the mouth of the pocket. A rectangular cover 54 is disposed over the outer surface to close the pocket between the surfaces 52 and 53, said cover being secured in place by cap screws 55 which project through said cover, the brake wedge holder 51, and the spacer block 50.

From the foregoing it will be seen that the wedge holder 51 affords a pocket which is closed on all sides except that side facing the column 14. To reinforce said wedge holder, there are provided retainer plates 56 and 57 welded across the top and righthand sides respectively of the spacer block 50 which said retainer plates slightly overlap the wedge holder 51. The retainer plates 56 and 57 reinforce the wedge holder 51 against upward pressure and horizontal pressure in the right-hand direction thereby relieving shear stress on the cap screws 55.

An elongated, rectangular bar or brake wedge 58 is disposed in the pocket of the brake wedge holder 51, said brake wedge normally being disposed in horizontal, flatwise engagement upon the bottom surface 52 of the pocket (FIG. 4). When the brake is actuated, said brake wedge is pivoted upwardly around its right-hand end to flatwise engagement with the upper surfaces 53 (FIG. 7).

The operation of the safety brake of this invention will be best understood with reference to FIGS. 4, 5 and 7. FIG. 4 illustrates the normal, unactuated position of the brake wherein the elevator structure 11 is being supported by a hoisting chain 17 on either side of said elevator structure with the brake lever 37 being in the horizontal position and the knurled brake wheel 46 being in its lowermost position and spaced slightly away from the column 14. The weight of the elevator structure at each side is taken by the lift lug 40 through the brake lever 37 with the remainder of the safety brake mechanism being relieved of all lifting force. In this position, the brake wedge 58 lies in the bottom of the pocket in the wedge holder 51 with the end thereof which is disposed toward the column 14 being spaced slightly away from said column to allow free vertical motion of the elevator. As long as there is tension upon the chain 17, the safety brake 10 will remain in the unactuated position as illustrated.

If for any reason the hoisting chain 17 becomes slack, such as would be caused by said chain breaking, the coil spring 47 immediately becomes effective to pivot the brake finger 32 upwardly thereby pushing the brake wheel 46 upwardly within its pocket. As shown in FIG. 5, this upward movement causes said brake wheel to be cammed inwardly toward the column 14 by the cam member 44. The brake is now in the position to quickly react to and resist any downward or free-all motion of the elevator structure. If said elevator structure falls, the knurled brake wheel 46 will roll in a counterclockwise direction, as illustrated by the arrow X in FIG. 5, due to the relative motions between the mutually facing surfaces of the cam member 44 and the side of the column 14. The knurled periphery of the brake wheel 46 so frictionally engages the column 14 and the cam member 44 as to insure this positive rotation. The roller 34 of the brake finger 32 rotates freely to eliminate friction which would act against rotation of the brake wheel.

As the brake wheel turns, it wedges more tightly within the upwardly tapering pocket and exerts such lateral force against the cam member 44 in a left-hand direction that the base plate 20 is forced to shift toward the left relative to the shoulder screws 24 thereby pulling the end of the brake wedge 58 tightly against the opposite side of the column 14, as illustrated in FIG. 5. This contact between the brake wedge and the column causes said brake wedge to pivot upwardly to the position illustrated in FIG. 7 with its lower left-hand edge or corner biting firmly into the side of the column 14. At the same time, the brake wheel 46 continues to roll upwardly relative to said column and is cammed inwardly thereby slightly embedding itself into the column as illustrated by the indentation 46a. The falling elevator structure is positively and immediately stopped after moving downwardly only a very short distance due to the above described wedging action on both sides of the column.

The knurled brake wheel 46 and the brake wedge 58 are made of hardened steel whereby they will bite firmly and positively into the column 14. The knurling of the brake wheel insures the continued rotation of said wheel until the base has moved laterally a sufficient distance to bring the brake wedge into positive engagement with the opposite side of the column. Since the design is such that there is never any strain on the brake mechanism itself from the hoisting chain 17, said brake mechanism can be carefully set with just the correct amount of friction on the base plate 20 to cause it to normally hold its adjustment, including the clearance between the brake wheel and the column and the brake wedge and said column, while at the same time affording a quick, horizontal movement of said base plate when the brake is actuated. Because the axis of the roller 34 which is carried by the brake finger 32 is disposed in the direction of the column 14 beyond the axis of the brake wheel 46, said brake wheel is held away from said column thereby preventing accidental movement of said brake wheel upwardly. Upward movement of said brake wheel might occur if it were allowed to roll freely in the pocket against the column 14.

An added feature of the present safety brake apparatus is the provision of a safety switch 60 which is carried by the adjacent side wall 13 and which has a pivoted switch arm 61 projecting generally in a horizontal direction in a vertical plane with the brake lever 37. The switch arm 61, as herein illustrated, carries a roller 62 at its distal end which said roller is disposed beneath the brake lever 37 at the pivoted end of said brake lever.

In the normal, unactuated position of the safety brake of this invention wherein the brake lever 37 is disposed generally horizontally, the switch arm 61 is pivoted downwardly a slight amount as illustrated in FIG. 4 whereby said switch is in the actuated position. The power source for the elevator structure (not herein illustrated), which may be in the form of a reversible electric motor and gear mechanism therefor, is connected in series through the switch 60. If the elevator structure 11 has two of the safety brakes 10 as illustrated in FIG. 1, the circuit is connected in series through safety switches 60 on both sides of the elevator structure whereby upon actuation of either safety switch, all of the power is immediately cut off. If a safety brake 10 is actuated, the left-hand end of the brake lever 37 associated therewith will pivot upwardly as illustrated in FIGS. 5 and 7 thereby allowing the switch arm 61 to move upwardly and the safety switch 60 to return to a normal, open position. Thus, if either chain 17 breaks, the safety brake is immediately moved to the ready position to resist any free-fall movement while at the same time all power to the elevator structure is cut off. If the remaining chain 17 continues to hold, the elevator structure stops for lack of power, and if both chains break and the elevator structure falls, it only moves downwardly a slight distance before one or both of the safety brakes bring it to a positive stop. Upon repair of a broken chain or chains, the lifting force applied thereto will automatically reset the brakes to their normal, unactuated position and will also set the safety switch or switches to their circuit forming position.

It will be understood that many changes in the details of the invention as herein described and illustrated may be made without, however, departing from the spirit thereof or the scope of the appended claims.

What is claimed is:

1. A free-fall safety brake for an elevator structure, the structure having hoisting means and being disposed closely adjacent to a vertical, fixed column; said brake comprising means providing an upwardly tapered pocket having an open side adjacent to one side of the column; means providing a laterally tapered pocket having its larger end open and disposed adjacent to the other side of the column; said means providing said pockets being mounted on a single base member; means laterally shiftably mounting said member to the elevator structure in use; a wheel loosely disposed in the bottom of said upwardly tapered pocket and normally spaced from the column; a generally horizontal bar disposed in said laterally tapered pocket and normally spaced from said column; means connecting said brake to the hoisting means; said last mentioned means including means responsive to failure of the hoisting means and moving said wheel upwardly within said upwardly tapered pocket whereby said wheel is cammed against the column and upon fall of said elevator structure, said base member is shifted laterally and an end of said bar is brought into engagement with the column, said bar pivoting upwardly within said laterally tapered pocket whereby an edge of said bar is caused to bite into said column and said elevator structure is stopped.

2. A free-fall safety brake for a power driven elevator structure, the structure having hoisting means and being disposed closely adjacent to a vertical, fixed column; said brake comprising a base plate disposed in a vertical plane between the elevator structure and the column in use and having end portions projecting horizontally beyond either side of the column; means laterally shiftably mounting said base plate to the elevator structure; means providing a first pocket carried by one end portion, said first pocket having an open side directed toward the column; an upwardly and slightly inwardly inclined cam member spaced from the column, and being open at the bottom; means providing a second pocket carried by the other end portion, said second pocket having an open side directed toward the column and an inwardly and slightly upwardly inclined upper wall; pivoted linkage carried by said base plate including a first member connected to the hoisting means and a second member projecting below the open bottom of said first pocket; a wheel disposed in said first pocket and resting on said second member; spring means biasing said second member upwardly; a horizontal bar disposed in said second pocket and spaced from the column; said horizontal bar having a sharp, lower edge at the end thereof which is directed toward the column; means connecting said first and second members in such manner that the pull of the hoisting means maintains said second member in its lower position and failure of said hoisting means causes said second member to move upwardly and wedge said wheel between the column and said cam member, the arrangement being such that fall of the elevator structure increases the wedging action of said wheel, causes said base plate to be cammed laterally, and causes said bar to engage the column and pivot upwardly whereby said sharp, lower edge of said bar bites into the column and said elevator is stopped.

3. A free-fall safety brake as set forth in claim 2; a control element actuatable to cut off power to the elevator structure; said control element mounted to the elevator structure in use and having an operative portion contacting one of said members and responsive to the position of said one member whereby, when the hoisting means fails, said control element is actuated to cut off power to the elevator structure.

4. A free-fall safety brake for an elevator structure disposed closely adjacent to a vertical, fixed column; said brake comprising base plate means disposed in a vertical plane between the elevator structure and the column in use and having end portions projecting horizontally beyond either side of the column and partially embracing said column; means laterally shiftably mounting said base plate means to the elevator structure; means providing a first pocket carried by one end portion, said first pocket having an open side directed toward the column, an upwardly and slightly inwardly inclined cam member spaced from the column, and being open at the side adjacent to the column; means providing a second pocket carried by the other end portion, said second pocket having an open side directed toward the column and an inwardly and slightly upwardly inclined upper wall; a lift lug secured to the elevator structure in use; a generally horizontally disposed lever pivoted to said lug and projecting beyond said lug in either horizontal direction; said lug having stop means overlying a portion of said lever adjacent to one end of said lever; a hoisting chain connected to said one end of said lever for lifting said elevator structure, said chain normally holding said lever against said stop means; a finger member pivoted at one end to said end portion carrying said first pocket and having its nonpivoted end projecting beneath said open bottom; a link pivotally connecting the opposite end of said lever and an intermediate portion of said finger member whereby the upward pull on said hoisting chain pivots said finger downwardly; spring means carried by said end portion urging said finger upwardly and said one end of said lever downwardly; a knurled wheel disposed in said first pocket and resting on said finger; a horizontal bar disposed in said second pocket and spaced from the column; the arrangement being such that if said hoisting chain goes slack, said finger moves upwardly and wedges said wheel between the column and said cam member whereby fall of said elevator structure increases the wedging action of said wheel, causes said base plate means to shift laterally and causes said bar to engage the column and pivot upwardly against said upper wall with an edge of said bar biting into the column and causing said elevator to stop.

5. A free-fall safety brake as set forth in claim 4; a control switch actuatable to cut off power to said elevator structure; said switch carried by said elevator structure in use and having a pivoted actuating arm projecting with its distal end against said lever and normally held in a closed circuit position whereby, if said hoisting chain becomes slack and said lever pivots, said arm moves to an open circuit position and cuts off power to said elevator structure.

6. Elevator free-fall safety brake means comprising an elevator structure; a pair of vertical, fixed columns disposed on either side of said elevator structure; a pair of brake assemblies carried at each side of said elevator structure adjacent to each said column, each said brake assembly comprising a first wedge means disposed on one side of a column, a second wedge means disposed on the opposite side of the column, both of said wedge means being mounted on a single base plate, means laterally shiftably mounting said plate to said elevator structure, pivotable linkage carried by said elevator structure, spring means biasing said linkage to pivot in one direction; a flexible hoisting means connected to each said linkage normally supporting the weight of said elevator structure, said linkage including a member urging one of said wedge means into engagement with one of said columns whereby upon fall of said elevator structure, said plate associated therewith is shifted laterally and the other of said wedge means is brought into engagement with the column to stop the fall of said elevator structure, the pull of said hoisting means normally holding said member in a wedge release position against the bias of said spring means; and a control switch having an operative member in contact with each said linkage and responsive to pivoting of said linkage in said one direction for cutting off power to said elevator structure, the arrangement being such that if only one of said hoisting means becomes slack, the power to said elevator structure is cut off and said elevator stops, and if both of said chains become slack, at least one of said brakes will stop the fall of said elevator structure.

7. Safety mechanism for an elevator structure including an elevator and power driven hoisting means therefor, said hoisting means including a flexible hoisting member operatively connected with said elevator, a brake carried by said elevator in actuated position effective to operatively engage a portion of said elevator and stop free fall of said elevator and in unactuated position free of such engagement, a brake control member normally engaging said hoisting member in taut condition of the latter and thereby held in unactuated position, means urging said control member toward brake actuating position, a switch operatively connected with said power drive and held in operative position by engagement with said hoisting member in taut condition of the latter, and means urging said switch to inoperative position, whereupon, when said hoisting member goes slack, said brake control member causes application of said brake and said switch deenergizes said power drive.

8. Safety mechanism as defined in claim 7 including two of said hoisting members, each having operatively associated therewith one of said brake control members and one of said switches, and electric circuit means connecting said switches in series, whereby if either one of said hoisting members goes slack its associated brake control member causes application of its associated brake and its associated switch deenergizes said power drive.

References Cited by the Examiner

UNITED STATES PATENTS

| | | | |
|---|---|---|---|
| 1,389,867 | 9/1921 | Griffin | 187—88 |
| 3,215,231 | 11/1965 | Lodige | 187—88 |

EVON C. BLUNK, *Primary Examiner.*

H. C. HORNSBY, *Assistant Examiner.*